United States Patent
Takeda et al.

(10) Patent No.: US 6,766,829 B2
(45) Date of Patent: Jul. 27, 2004

(54) VALVE ASSEMBLY FOR GAS CYLINDER

(75) Inventors: Masaru Takeda, Amagasaki (JP); Osamu Hirakami, Amagasaki (JP); Shinji Maekawa, Amagasaki (JP)

(73) Assignee: Kabushiki Kaisha Neriki, Hyogo (JP)

( * ) Notice: Subject to any disclaimer, the term of this patent is extended or adjusted under 35 U.S.C. 154(b) by 164 days.

(21) Appl. No.: 10/097,963

(22) Filed: Mar. 15, 2002

(65) Prior Publication Data

US 2002/0092575 A1 Jul. 18, 2002

Related U.S. Application Data

(63) Continuation-in-part of application No. 09/783,541, filed on Feb. 15, 2001.

(30) Foreign Application Priority Data

Feb. 18, 2000 (JP) ...................................... P 2000-40667

(51) Int. Cl.[7] .............................................. F16K 11/10
(52) U.S. Cl. ....................................... 137/877; 137/613
(58) Field of Search ................................. 137/877, 613

(56) References Cited

U.S. PATENT DOCUMENTS 862,867 A * 8/1907 Eggleston .................. 251/61.1

| | | |
|---|---|---|
| 5,309,945 A | 5/1994 | Sakai et al. |
| 5,738,145 A | 4/1998 | Daicho et al. |
| 5,996,625 A | 12/1999 | Collado et al. |

FOREIGN PATENT DOCUMENTS

| | | |
|---|---|---|
| EP | 0275242 | 7/1988 |
| EP | 0908807 | 4/1999 |
| GB | 821696 | 10/1959 |
| JP | 3219172 | 9/1991 |
| JP | 5-215299 | 8/1993 |
| JP | 2821699 | 9/1998 |

* cited by examiner

Primary Examiner—John Fox
(74) Attorney, Agent, or Firm—Bacon & Thomas, PLLC (57) ABSTRACT

Within a housing (3), a gas inlet (4) communicates with a gas outlet (5) through an inlet passage (11), a shut off valve (12) and an outlet passage (13), and a charging port (6) communicates with a discharging port (7) via a bypass passage (14). The outlet passage (13) is provided with a first pressure reducing valve (21) of piston type, a second pressure reducing valve (22) of diaphragm type and a first check valve (31) for retaining residual pressure, in series in the mentioned order. The bypass passage (14) is provided with a second check valve (32) which inhibits a flow from the discharging port (7) to the charging port (6).

16 Claims, 7 Drawing Sheets

VALVE ASSEMBLY FOR GAS CYLINDER

This application is a Continuation-in-Part of nonprovisional application Ser. No. 09/783,541 filed Feb. 15, 2001.

BACKGROUND OF THE INVENTION

1. Field of the Invention

The present invention relates to a valve assembly which is attached to a gas cylinder containing compressed gas or liquefied gas and is used for taking the gas out of the gas cylinder and charging it thereto. More specifically, it concerns a valve assembly with pressure reducing function, which makes it possible to take out high pressure gas within a gas cylinder as it is reduced to a desired low pressure when taking it out of the gas cylinder.

2. Explanation of Related Art

A conventional example of the valve assembly with pressure reducing function of this type is disclosed in U.S. Pat. No. 2,821,699 proposed earlier by an Assignee of the present invention.

The conventional valve assembly comprises a housing within which a gas inlet, a shut of f valve, a pressure reducing valve, a first check valve for retaining residual pressure and a gas outlet are arranged in series in the mentioned order. There is provided a bypass passage in parallel with the pressure reducing valve between an outlet of the shut off valve and the first check valve. The bypass passage is provided with a second check valve which inhibits a flow from the outlet of the shut off valve to the gas outlet. The pressure reducing valve has a piston which moves for opening and closing by a balance between a spring force for valve opening and a downstream pressure for valve closing.

The conventional valve assembly is excellent in that it can take out gas within a gas cylinder as its pressure is reduced by the pressure reducing valve when taking it out of the gas cylinder and besides in that it charges gas into a gas cylinder within a short period of time since it can charge the charging gas supplied to the gas outlet during the gas charging, into the gas cylinder via the bypass passage having a small flow resistance and a gap produced when the shut off valve opens. However, the conventional technique still has to be improved on the following points.

In the case where gas to be taken out must have its pressure largely reduced in comparison with that of high pressure gas within a gas cylinder, it is required to increase a pressure receiving area of the piston of the pressure reducing valve so as to smoothly move the piston for valve closing. In consequence, the conventional technique enlarges a diameter of the piston to entail a problem of making the valve assembly large and very heavy.

Further, when charging gas, the shut off valve has to be opened. Therefore, it takes labor to effect the opening operation. Also on this point, the conventional technique must be improved.

SUMMARY OF THE INVENTION

The present invention has an object to provide a valve assembly with pressure reducing function which is compact and facilitates the charging work.

In order to accomplish the foregoing object, the present invention has constructed a valve assembly in the following manner, for example, as shown in FIGS. 1 to 4, FIG. 5 or FIGS. 6 and 7.

Within a housing 3, a communication is provided between an inlet passage 11 and a shut off valve 12 and an outlet passage 13 and a gas outlet 5 in the mentioned order. Further, a bypass passage 14 and a charging port 6 communicates with each other within the housing 3. The inlet passage 11 and the bypass passage 14 communicate with an interior space (A) of a gas cylinder 1. A first pressure reducing valve 21, a second pressure reducing valve 22 and a first check valve 31 for retaining residual pressure are arranged in the outlet passage 13 in series in the mentioned order from the shut off valve 12 toward the gas outlet 5. The bypass passage 14 is provided with a second check valve 32 which inhibits a flow from the interior space (A) of the gas cylinder 1 to the charging port 6.

The present invention functions in the following manner, for example, as shown in FIGS. 1 to 4.

When taking out gas, the shut-off valve 12 is opened. Then high pressure gas within the interior space (A) of the gas cylinder 1 is reduced to a predetermined middle pressure by the first pressure reducing valve 21 and subsequently is reduced to a desired low pressure by the second pressure reducing valve 22. Thereafter, the low pressure gas is taken out of the gas outlet 5 through the first check valve 31.

While taking out the gas, if reversely flowing gas invades the gas outlet 5 for any reason, the first check valve 31 inhibits the reverse flow to prevent an interior area of the gas cylinder 1 from being contaminated with the reversely flowing gas.

When the gas is continuously taken out until a residual pressure within the gas cylinder 1 lowers to a set pressure, a first check spring 90 automatically closes the first check valve 31. This prevents further gas take-out to retain the residual pressure within the gas cylinder 1 at the set pressure.

When charging high pressure gas into the evacuated gas cylinder 1, charging gas is supplied to the charging port 6. Then the charging gas is charged into the gas cylinder 1 through the second check valve 32 of the bypass passage 14.

Consequently, the present invention produces the following advantages.

The high pressure gas within the gas cylinder is reduced in multiple stages by a plurality of pressure reducing valves. This largely reduces a diameter of a pressure receiving member (piston, diaphragm and the like) of every pressure reducing valve when compared with a pressure reducing valve of single reduction type. This enables the plurality of pressure reducing valves to be readily installed in a redundant space within the housing, which results in preventing the projection of constituent members of these pressure reducing valves from the housing to thereby make the valve assembly compact and light. The foregoing construction could provide a compact valve assembly with pressure reducing function.

In the valve assembly, the bypass passage 14 is arranged in parallel with the shut off valve 12. In this case, when charging the high pressure gas into the evacuated gas cylinder 1, the charging gas is supplied to the charging port 6 with the shut off valve 12 kept closed. Then the charging gas is charged into the gas cylinder 1 through the second check valve 32 of the bypass passage 14. This makes it unnecessary to open the shut off valve 12 when charging the gas, differently from the conventional technique. Further, it does not take much labor to charge the gas, which results in an easy gas charging.

In the valve assembly, the bypass passage 14 communicates with an inter-space between the shut off valve 12 and the first pressure reducing valve 21 of the outlet passage 13. And a closing means (C) stops gas flow-out from the gas outlet 5. The closing means (C) is provided downstream of a position where it communicates with the bypass passage 14 of the outlet passage 13, or at the gas outlet 5. In this case, after the closing means (C) has been closed, the shut off valve 12 is opened to supply the charging gas to the charging port 6. Additionally, in the event that the second check valve 32 arranged in the bypass passage 14 has lost its checking function for any reason, the shut off valve 12 is closed. Then it is possible to prevent the gas within the gas cylinder 1 from being charged from the bypass passage 14 to an exterior area through the gas charging port 6. As a result, even with the high pressure gas stored within the gas cylinder 1, the second check valve 32 can be readily repaired or replaced.

The closing means (C) can be formed from at least one of the first pressure reducing valve 21 and the second pressure reducing valve 22, for example, by making it have a set pressure on its downstream adjustable to '0' (zero). Alternatively, the closing means (C) may be composed of a second shut off valve which is arranged at a halfway portion of the outlet passage 13. In addition, the closing means (C) may be provided in a connector which is detachably attached to the gas outlet 5.

In the valve assembly, the first pressure reducing valve 21 is formed into a piston-type structure and the second pressure reducing valve 22 is constructed into a diaphragm-type structure. In this case, the first pressure reducing valve of the piston-type strongly reduces the pressure of the gas and thereafter the second pressure reducing valve reduces it with high accuracy. This can supply desired low pressure gas stably. It is a matter of course that the first pressure reducing valve of the piston-type and the second pressure reducing valve of the diaphragm-type can be formed into various structures, respectively.

In the valve assembly, a first handle 56 which opens and closes the shut off valve 12 and a second handle 82 which adjusts a set pressure of the second pressure reducing valve 22 are arranged side by side on an upper surface of the housing 3 in a horizontal direction. Further, a first pressure gauge 41 which communicates with the interior space (A) of the gas cylinder 1 and a second pressure gauge 42 which communicates with a downstream side of the second pressure reducing valve 22 are disposed side by side on a front surface of the housing 3 in a vertical direction. Moreover, the gas outlet 5 and the charging port 6 are positioned side by side in the vertical direction on any one of a rear surface and both side surfaces of the housing 3. In this case, the first and the second two handles can be operated from the same upper direction and besides the first and the second two pressure gauges can be confirmed with eyes from the same front direction. Further, a gas take-out mouthpiece and a gas charging mouthpiece can be connected to the two connection ports of the gas outlet and the charging port from the same direction, respectively. This enormously improves the operability and workability of the valve assembly. In addition, two mutually relating ones of the constituent instruments of the valve assembly are provided in the same direction. This facilitates the working of bores and threads for attaching these instruments to result in the possibility of manufacturing the valve assembly inexpensively.

In the valve assembly, when the gas outlet 5 is arranged upwards of the charging port 6 and the second pressure gauge 42 is disposed upwards of the first pressure gauge 41, it is possible to arrange at relatively high positions the gas outlet which is connected at a site where the gas cylinder is installed as well as the second pressure gauge which indicates a pressure of the gas to be taken out. This improves the working efficiency at the installation site.

In the valve assembly, if there is provided an orifice or the like flow resistance applying means 104 between the first check valve 31 and the gas outlet 5, it is possible to apply a predetermined flow resistance to gas having its pressure reduced to a desired low pressure by the second pressure reducing valve. This can control the flow amount of the gas to be taken out of the gas outlet substantially at a predetermined value.

BRIEF DESCRIPTION OF THE DRAWINGS

FIGS. 1 to 4 show an embodiment of the present invention;

FIGS. 6 and 7 show another modification of the present invention;

DESCRIPTION OF THE PREFERRED EMBODIMENTS

Hereafter, an embodiment of the present invention is explained with respect to FIGS. 1 to 4.

Figure 1:
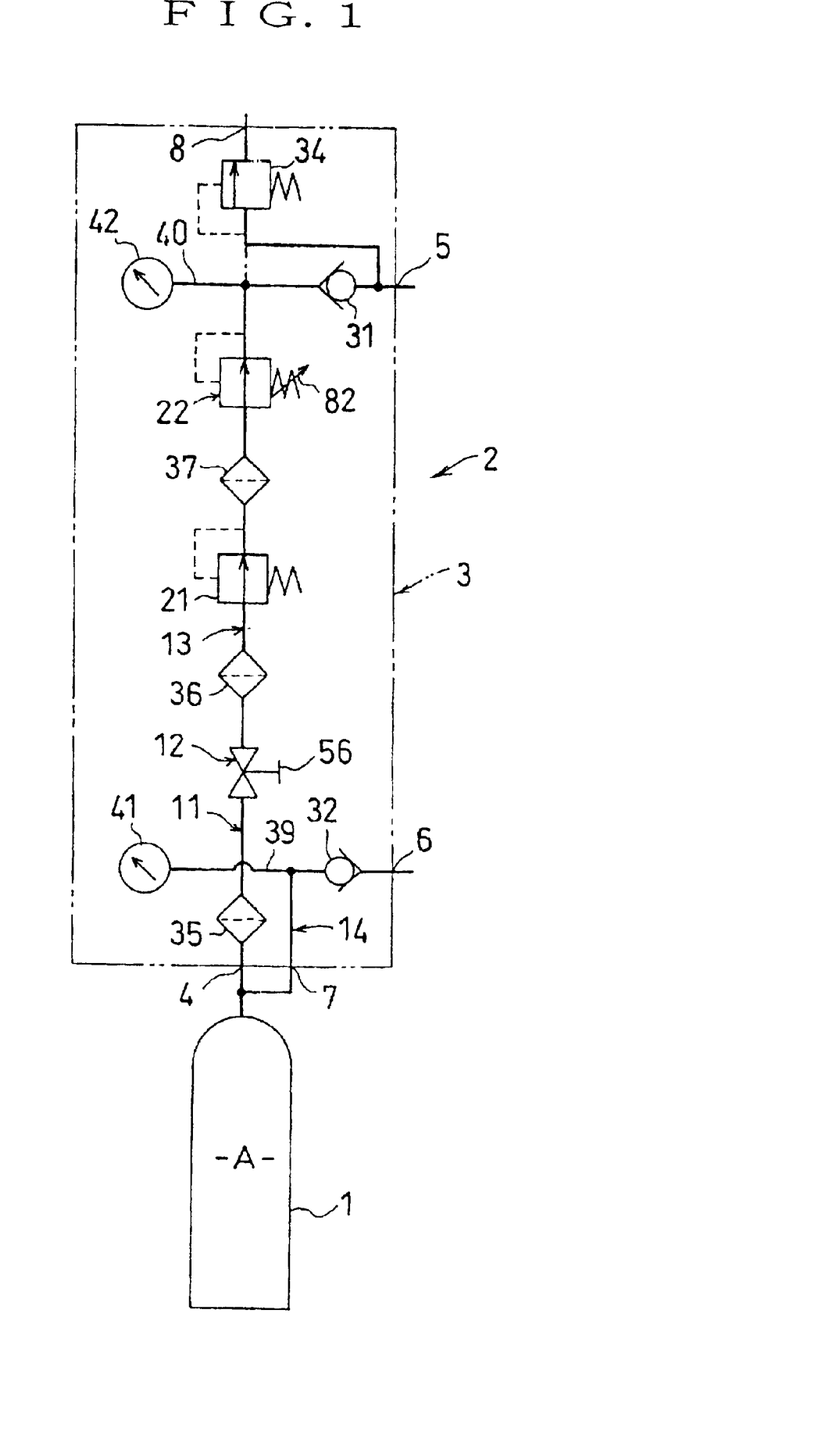
FIG. 1 is a system diagram of a valve assembly.

First, explanation is given for outline of a valve assembly by resorting to a system diagram of FIG. 1.

The valve assembly 2 fixed to a gas cylinder 1 comprises a housing 3 which has an outer surface provided with a gas inlet 4, a gas outlet 5, a charging port 6, a discharging port 7 and a relief port 8. And an interior space (A) of the gas cylinder 1 communicates with the gas outlet 5 through the gas inlet 4, an inlet passage 11, a shut off valve 12 and an outlet passage 13 within the housing 3. The interior space (A) also communicates with the charging port 6 via the discharging port 7 and a bypass passage 14 within the housing 3.

The outlet passage 13 is provided with a first pressure reducing valve 21, a second pressure reducing valve 22 and a first check valve 31 for retaining residual pressure, in series in the mentioned order, from the shut off valve 12 toward the gas outlet 5. Further, the bypass passage 14 is arranged in parallel with the gas inlet 4, the inlet passage 11, the shut off valve 12 and the outlet passage 13. And it is provided with a second check valve 32 which inhibits a flow from the discharging port 7 to the charging port 6.

A downstream safety valve 34 is disposed between an outlet side of the first check valve 31 and the relief port 8. Besides, a first filter 35, a second filter 36 and a third filter 37 are attached to the respective inlet sides of the shut off valve 12, the first pressure reducing valve 21 and the second pressure reducing valve 22. In addition, the bypass passage 14 communicates with a first pressure gauge 41 via a first communication passage 39 and the second pressure reducing valve 22 has an outlet communicating with a second pressure gauge 42 via a second communication passage 40.

The valve assembly 2 is used in the following manner. The gas cylinder 1 is charged with high pressure gas having a pressure not less than the conventional charging pressure of [about 15 MPa (about 150 kgf/cm$^2$)], for example, about 15 MPa to 30 MPa (about 150 kgf/cm$^2$ to 300 kgf/cm$^2$).

When taking out the gas, a gas take-out mouthpiece (not shown) is connected to the gas outlet 5 and the shut off valve 12 is opened. Then the high pressure gas within the interior space (A) of the gas cylinder 1 is reduced to a predetermined middle pressure by the first pressure reducing valve 21 and subsequently is reduced to a desired low pressure by the second pressure reducing valve 22. Thereafter, the low pressure gas is taken out of the gas outlet 5 through the first check valve 31.

During the gas take-out, in the event that the gas outlet 5 has an abnormally high pressure because foreign matters have bitten the second pressure reducing valve 22 or the first check valve 31 or for the like reason, the abnormal pressure is relieved through the downstream safety valve 34.

Further, if reversely flowing gas invades the gas outlet 5 for any reason during the gas take-out, the first check vale 31 inhibits the reverse flow to prevent an interior area of the gas cylinder 1 from being contaminated with the reversely flowing gas.

When the gas is continuously taken out until a residual pressure within the gas cylinder 1 lowers to a set pressure, a check spring (not shown) automatically closes the first check valve 31. This prevents further gas take-out to retain the residual pressure within the gas cylinder 1 at the set pressure. As a result, it is possible to prevent the atmosphere from invading the interior area of the gas cylinder 1 even with the shut off valve 12 kept open by mistake.

When charging high pressure gas into the evacuated gas cylinder 1, a gas charging mouthpiece (not shown) is connected to the charging port 6 with the shut off valve 12 closed and the high pressure charging gas is supplied through the mouthpiece. Then the charging gas is charged into the gas cylinder 1 through the charging port 6, the second check valve 32 and the discharging port 7 in the mentioned order.

Figure 2:
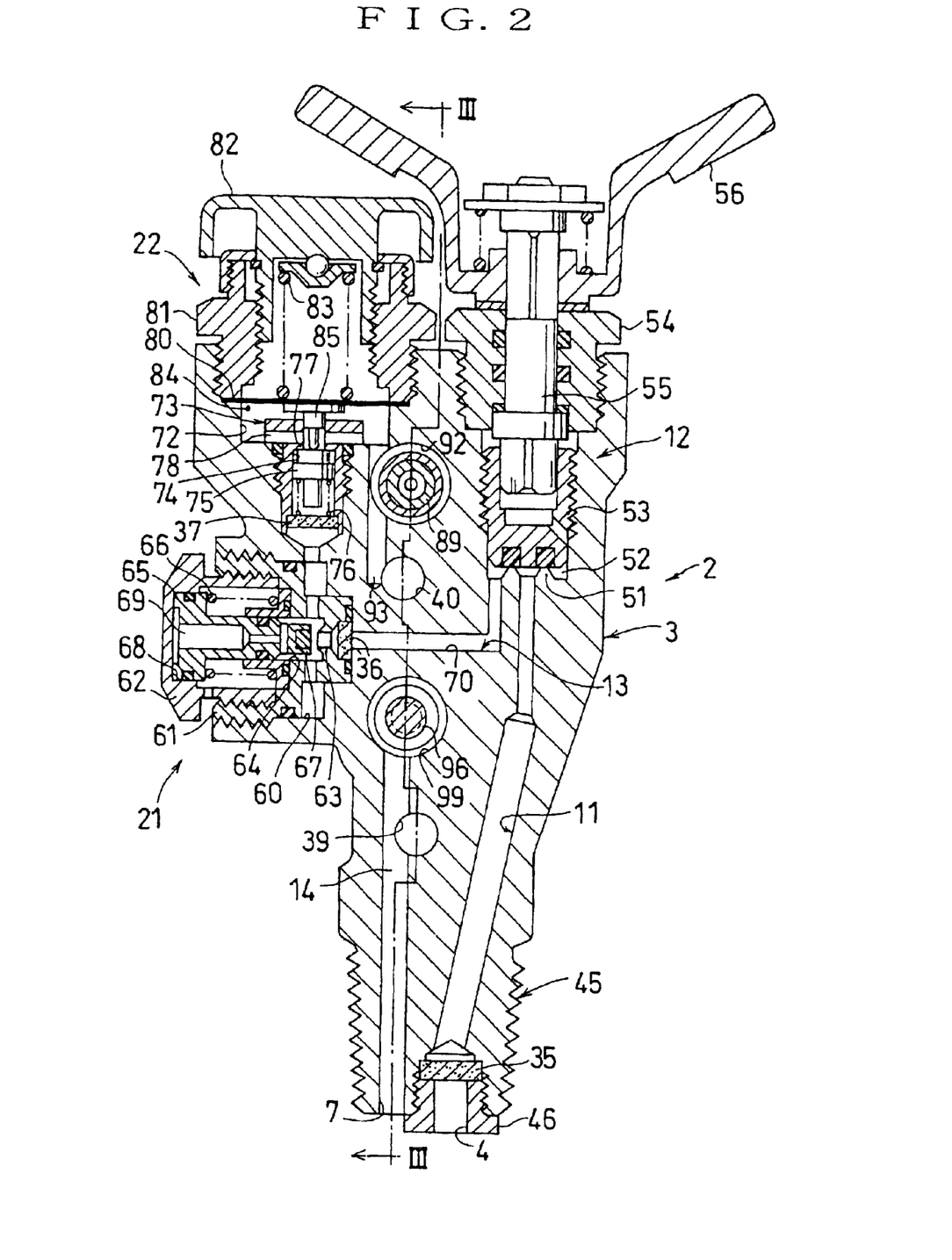
FIG. 2 is a sectional view when the valve assembly is seen form a front side.
Figure 3:
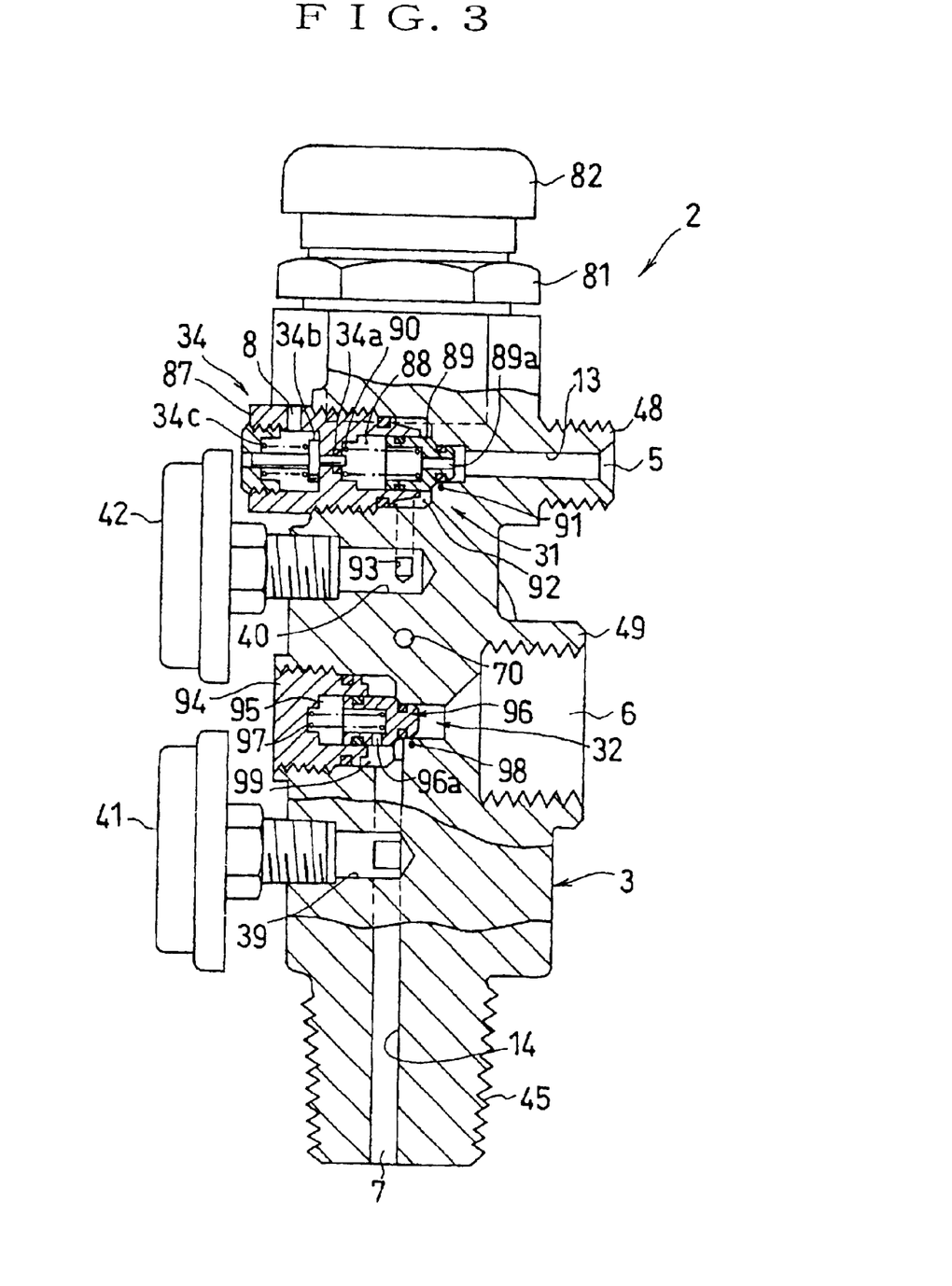
FIG. 3 is a sectional view when the valve assembly is seen from a right side and corresponds to a view when it is seen along a line III—III in FIG. 2 in a direction indicated by arrows.
Figure 4:
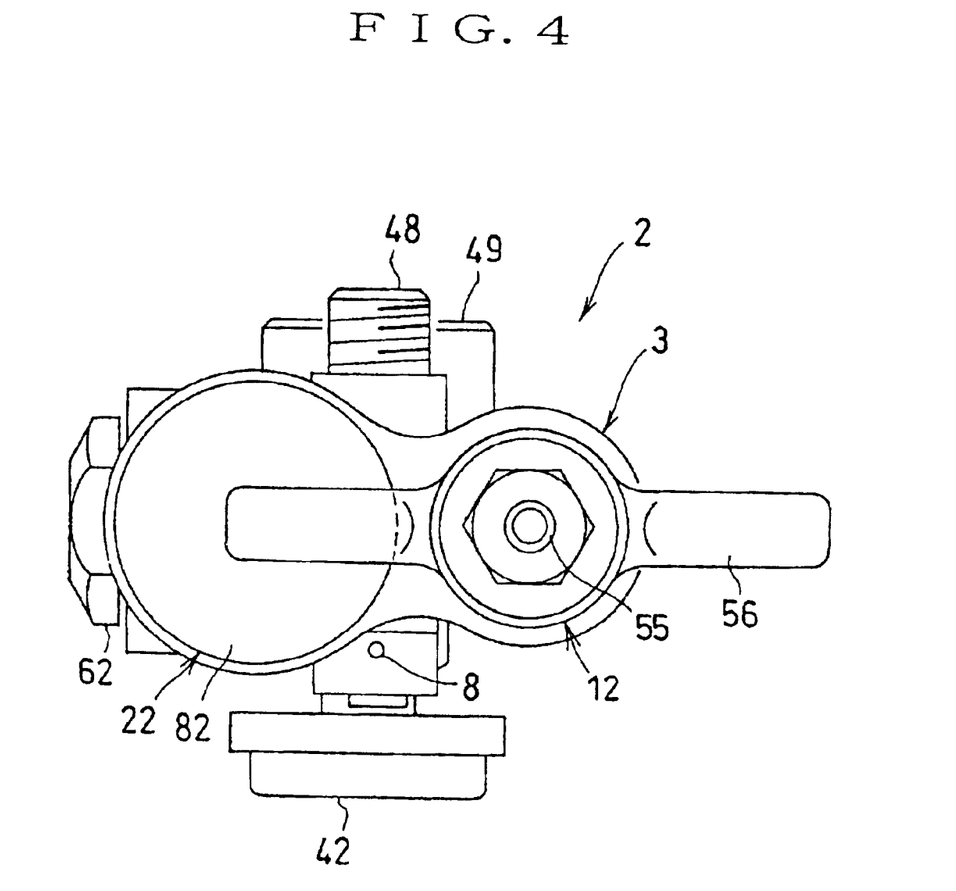
FIG. 4 is a plan view of the valve assembly.

Next, a concrete structure of the valve assembly 2 is explained by relying on FIGS. 2 to 4 with reference to the above-mentioned system diagram of FIG. 1. FIG. 2 is a sectional view when the valve assembly is seen from a front side. FIG. 3 is a sectional view when the valve assembly is seen from a right side and corresponds to a view when it is seen along a line III—III in FIG. 2 in a direction indicated by arrows. FIG. 4 is a plan view of the valve assembly.

A threaded leg 45 of the housing 3 has an under surface opened to provide the gas inlet 4 and the discharging port 7. The first filter 35 is pushed to a lower portion of the inlet passage 11 by an annular bolt 46. The housing 3 has a rear surface on which an outlet nozzle 48 provided with the gas outlet 5 and a charging nozzle 49 provided with the charging port 6 are arranged in a vertical direction.

The shut off valve 12 is provided at a right upper portion when the housing 3 is seen from the front side.

A shut off valve seat 51 is formed at an upper end of the inlet passage 11. Formed upwards of the shut off valve seat 51 is a vertically extending shut of f valve chamber 52, with which a shut off member 53 engages in screw-thread fitting relationship. The shut off member 53 moves up and down with respect to the shut off valve seat 51. A spindle 55 is hermetically inserted into a first externally threaded closure 54. The spindle 55 has a lower portion fitted into the shut off member 53. The spindle 55 has an upper portion to which a first handle 56 of lever-type is attached.

The first pressure reducing valve 21 is formed into a cassette-type structure and is provided at a left portion of a halfway height position of the housing 3.

A cassette cylinder 61 is hermetically fitted into a first attaching bore 60 provided by opening a left surface of the housing 3, in screw-thread engagement. The cassette cylinder 61 has an inner peripheral surface into which a bottomed sleeve 62 is fitted in screw-thread engagement. The cassette cylinder 61 has a right end portion to which the second filter 36 is attached. Reference numeral 63 indicates a first pressure reducing valve seat and reference numeral 64 designates a first pressure reducing valve chamber.

A first opening spring 66 pushes leftwards a piston 65 hermetically inserted into the sleeve 62. The piston 65 has a right projection a front end of which is provided with a first pressure reducing member 67 and has a left side on which a first actuation chamber 68 is formed. The first actuation chamber 68 communicates with the first pressure reducing chamber 64 through a communication hole 69 within the piston 65.

And the first pressure reducing member 67 moves for opening and closing with respect to the first pressure reducing valve seat 63 by a balance between a leftward valve-opening force produced by the first opening spring 66 and a rightward valve-closing force which acts on the piston 65 from the first actuation chamber 68.

The second pressure reducing valve 22 is provided upwards of the first pressure reducing valve 21 and leftwards of the shut off valve 12.

A second attaching bore 72 is provided by opening an upper surface of the housing 3. A sleeve 73 is hermetically fitted into a radially reduced portion of the second attaching bore 72 in screw-thread engagement. A second pressure reducing member 75 is inserted into a second pressure reducing valve chamber 74 within the sleeve 73. The second pressure reducing member 75 is urged toward a second pressure reducing valve seat 77 by a closing spring 76. The sleeve 73 has a lower portion to which the third filter 37 is fixed and has an upper portion formed with a horizontal outlet groove 78.

A second externally threaded closure 81 hermetically fixes a diaphragm 80 composed of a resilient member such as rubber and synthetic resin, onto a peripheral wall of a radially increased portion of the second attaching bore 72. The second externally threaded closure 81 has inner threads with which a second columnar handle 82 engages in screw-thread fitting relationship vertically movably. A second opening spring 83 is attached between the second handle 82 and the diaphragm 80. A second actuation chamber 84 is formed downwards of the diaphragm 80. Further, the diaphragm 80 is connected to the second pressure reducing member 75 through a push rod 85.

And the second pressure reducing member 75 moves for opening and closing with respect to the second pressure reducing valve seat 77 by a balance between a downward valve-opening force of the second opening spring 83 adjusted by the second handle 82 and a valve-closing force which comprises an upward force acting on the diaphragm 80 from the second actuation chamber 84 and an urging force of the closing spring 76 added thereto.

The first check valve 31 for retaining residual pressure is provided between the second pressure reducing valve 22 and the shut off valve 12 substantially coaxially with the outlet nozzle 48.

A sleeve 87 is hermetically fitted into the housing 3 in screw-thread engagement from the front side. The sleeve 87 has within its innermost portion a first check valve chamber 88, into which a first cylindrical check member 89 is hermetically inserted. The first check member 89 is brought into contact with a first check valve seat 91 by a first check spring 90. The first check member 89 has an outer periphery formed with an annular inlet 92. The annular inlet 92 communicates with the second actuation chamber 84 through a vertical passage 93.

The first check valve chamber 88 has a bottom wall provided with a valve seat 34*a* of the downstream safety valve 34. A safety member 34*b* is brought into closing contact with the valve seat 34*a* by a spring 34*c*. The relief port 8 is opened upwards.

The second check valve 32 is provided downwards of the first check valve 31 and substantially coaxially with the charging nozzle 49.

A cap 94 is hermetically fitted into the housing 3 from the front side in screw-thread engagement. A second check member 96 is inserted into a second check valve chamber 95 within the cap 94. The second check member 96 is brought into closing contact with a second check valve seat 98 by a second check spring 97.

The second check valve chamber 95 communicates with the bypass passage 14 via a through hole 96*a* of the second check member 96 and an annular outlet 99.

The first communication passage 39 branched from the bypass passage 14 is opened at a lower side portion of a front surface of the housing 3. The first pressure gauge 41 is fitted into such opening portion in screw-thread engagement. The second communication passage 40 branched from the vertical passage 93 is opened at an upper side portion of the front surface of the housing 3. The second pressure gauge 42 is fitted into that opening portion in screw-thread engagement.

Although this embodiment adopts those of Bourdon-tube type for the first pressure gauge 41 and the second pressure gauge 42, pressure indicating means of other kinds may be employed.

The valve assembly 2 operates as follows.

When taking gas out of the gas cylinder 1, a gas take-out mouthpiece (not shown) is connected to the outlet nozzle 48 and the shut off member 53 of the shut off valve 12 is opened by the first handle 56.

Then the gas within the gas cylinder 1 flows out to the first pressure reducing valve chamber 64 through the gas inlet 4, the first filter 35, the shut off valve seat 51, the shut off valve chamber 52, a communication passage 70, the second filter 36, and a gap produced when the first pressure reducing member 67 moves for opening with respect to the first pressure reducing valve seat 63. Next, it flows out to the annular inlet 92 through the third filter 37, the second pressure reducing valve chamber 74, a gap produced when the second pressure reducing member 75 moves for opening with respect to the second pressure reducing valve seat 77, the outlet groove 78, and the vertical passage 93. Subsequently, the flowed-out gas separates the first check member 89 from the first check valve seat 91 against the first check spring 90 with its pressure and thereafter is taken out of the gas take-out mouthpiece (not shown) through the gas outlet 5.

In the case where an interior area of the gas outlet 5 has an abnormally high pressure for any reason, the gas of the abnormal pressure flows into the first check valve chamber 88 via a through hole 89*a* of the first check member 89. The flowed-in gas separates the safety member 34*b* from the valve seat 34*a* with its pressure.

In the gas take-out state, the second check member 96 is brought into closing contact with the second check valve seat 98 by a force resultant from an inner pressure of the second check valve chamber 95 and an urging force of the second check spring 97. During the gas take-out, when reversely flowing gas has entered the gas outlet 5 for any reason, it flows into the first check valve chamber 88 via the through hole 89*a* of the first check member 89. This reversely flowing gas brings the first check member 89 into closing contact with the first check valve seat 91 with its pressure.

When the gas is continuously taken out until the gas cylinder 1 has a residual pressure lowered to a set pressure, a valve-closing force of the first check spring 90 overcomes a valve-opening force produced by a gas pressure of the annular inlet 92 to bring the first check member 89 into closing contact with the first check valve seat 91. This enables the interior area of the gas cylinder 1 to keep its set residual pressure.

When charging high pressure gas into the evacuated gas cylinder 1, the gas charging mouthpiece (not shown) is connected to the charging nozzle 49. The high pressure gas is supplied to the charging port 6 through the gas charging mouthpiece with the shut off valve 12 closed. Then the high pressure gas separates the second check member 96 from the second check valve seat 98 and thereafter is charged into the gas cylinder 1 through the discharging port 7.

Figure 5:
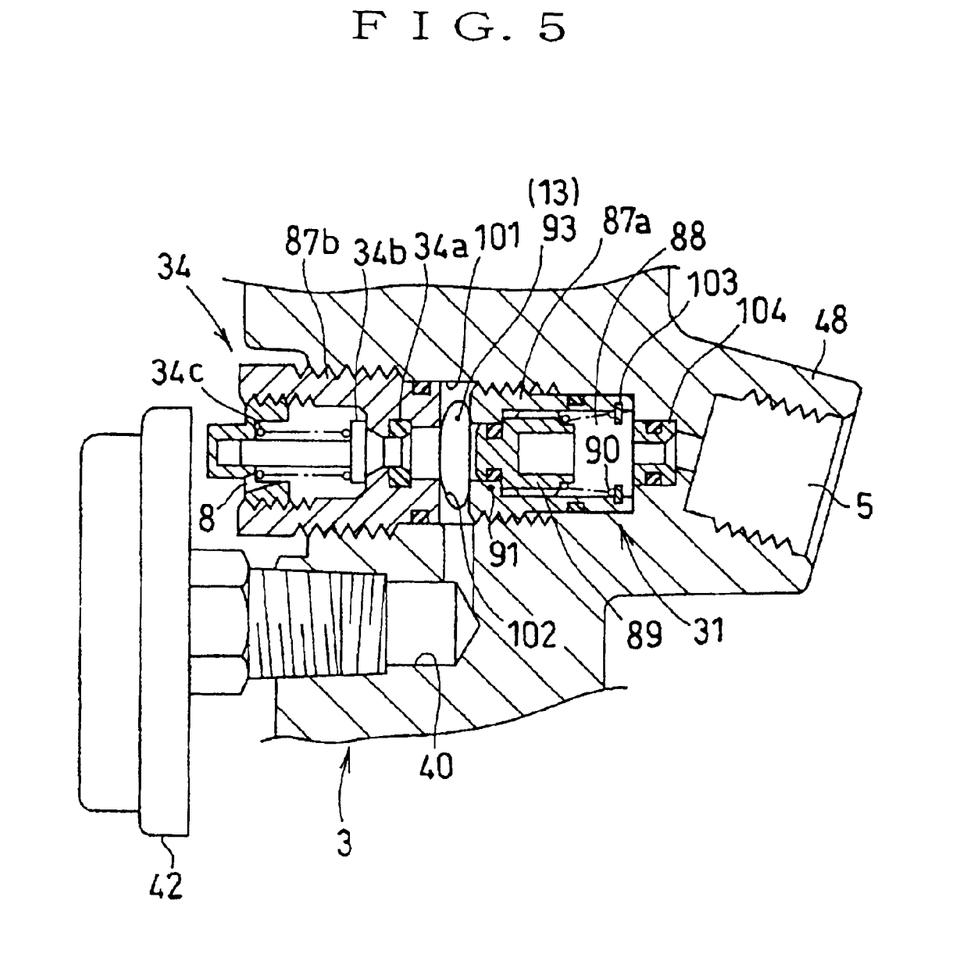
FIG. 5 shows a modification of the present invention and is a partial enlarged view similar to FIG. 3.

FIG. 5 shows a modification of the present invention and is a partial enlarged view similar to FIG. 3. The modification shown in FIG. 5 has the same or similar constituent members as those of the embodiment shown in FIG. 3, which are indicated by the same numerals, and is different therefrom on the following points.

The housing 3 is formed with a horizontal bore 101 having an inner portion (a right portion) into which a first sleeve 87*a* is fitted in screw-thread engagement. The first check valve 31 is attached to the first sleeve 87*a*. The horizontal bore 101 has an opening portion (a left portion) into which a second sleeve 87*b* is fitted in screw-thread engagement. The downstream safety valve 34 is attached to the second sleeve 87*b*. The horizontal bore 101 has a horizontal mid portion crossing the vertical passage 93 between the two sleeves 87*a* and 87*b*. Reference numeral 102 designates an opening at the crossing portion. More specifically, the downstream safety valve 34 communicates with an inlet of the first check valve 31 (see one-dot chain line in FIG. 1) instead of the outlet thereof.

The first check valve 31 has the first check valve seat 91 and the first check valve chamber 88 arranged in the mentioned order from an upstream side. The first check member 89 is inserted into the first check valve chamber 88. The first check valve 31 functions substantially in the same manner as the above mentioned embodiment. In this modification, the first check spring 90 composed of a compression coil spring has a right end received by a right end portion of the first sleeve 87*a* through a snap ring 103. Instead, the coiled portion of the first check spring 90 may have its right portion fitted into the right end portion of the first sleeve 87*a* in screw-thread engagement.

The downstream safety valve 34 is constructed substantially in the same manner as in the above-mentioned embodiment except that the relief port 8 is opened toward the front surface.

Further, the outlet nozzle 48 projects obliquely and downwardly. The gas outlet 5 within the outlet nozzle 48 is opened obliquely and downwardly. The gas outlet 5 is inclined with respect to a horizontal plane by an angle, which is set to about 15 degrees here. This can prevent the angular bending of a hose portion (not shown) of the gas take-out mouthpiece connected to the gas outlet 5 to result in elongating the lifetime of the hose portion. The inclination angle of the gas outlet 5 preferably has a value falling within a range of about 10 degrees to about 30 degrees and more preferably has a value falling within a range of about 10 degrees to about 20 degrees.

Besides, a flow resistance applying means 104 which comprises an orifice is provided at a terminal portion of the outlet passage 13 between the first check valve 31 and the gas outlet 5. The flow resistance applying means 104 applies a flow resistance to the gas which passes through the terminal portion of the outlet passage 13, thereby making it possible to control the flow amount of the gas to be taken out of the gas outlet 5 substantially at a predetermined value.

Figure 6:
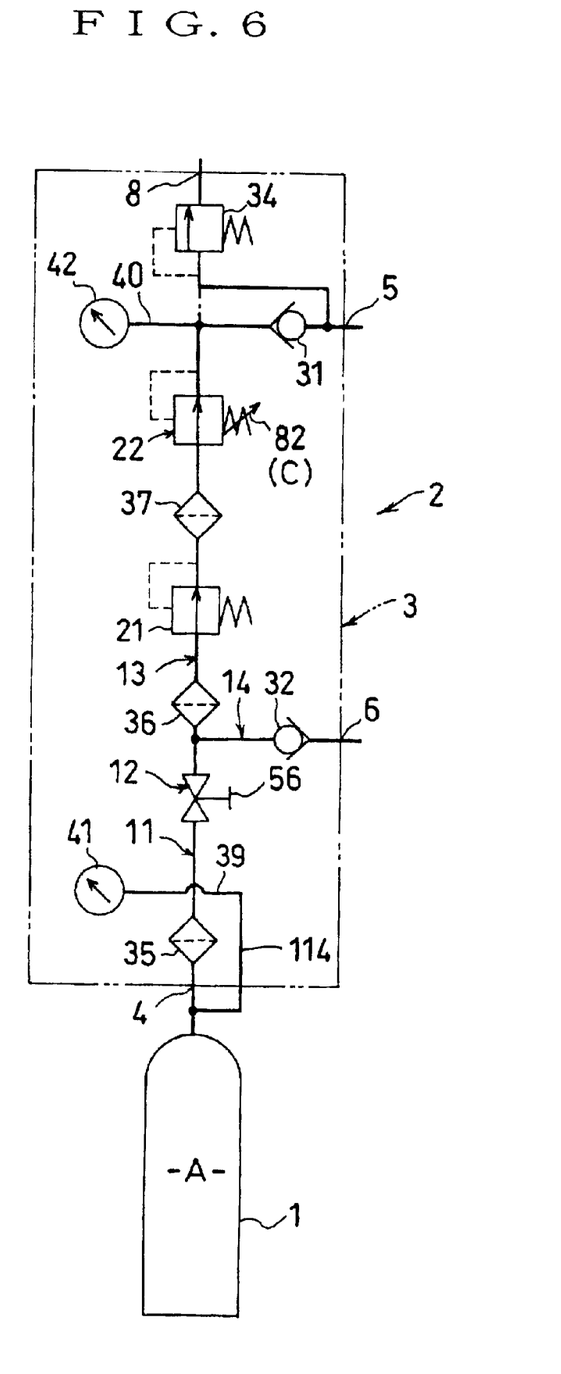
FIG. 6 is a system diagram of a valve assembly.
Figure 7:
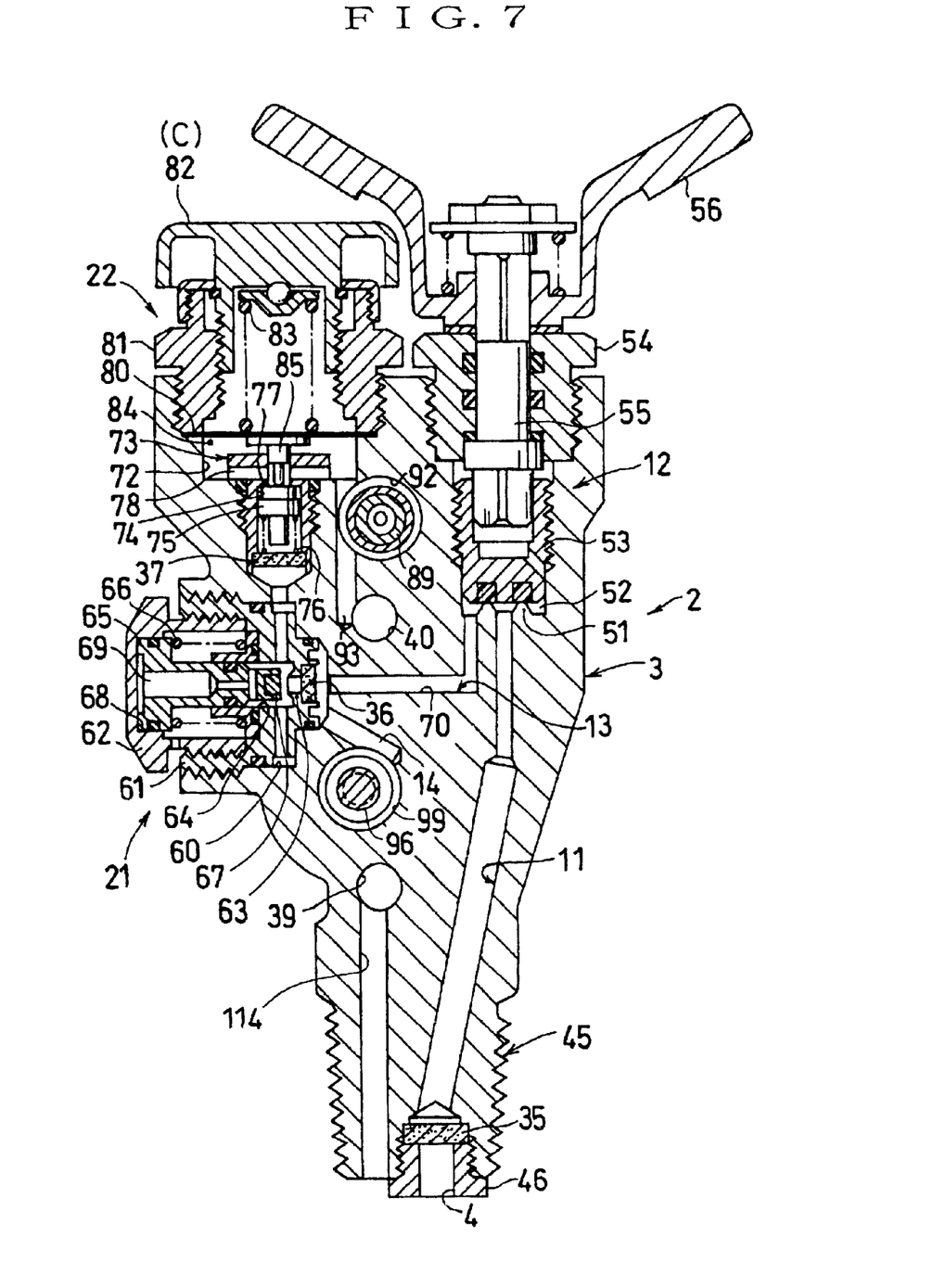
FIG. 7 is a sectional view of the valve assembly when seen from the front side.

FIGS. 6 and 7 show another modification of the present invention, and are similar to FIGS. 1 and 2, respectively. In this modification, the same or similar constituent members as those of FIGS. 1 and 2 are designated by the same numerals. This modification differs from the above embodiment shown in FIGS. 1 and 2 on the following points.

As shown in FIG. 6, the bypass passage 14 communicates with an inter-space between the shut off valve 12 and the first pressure reducing valve 21 of the outlet passage 13. Further, the first pressure gauge 41 communicates with the interior space (A) of the gas cylinder 1 through the first communication passage 39 and a third communication passage 114. Besides, the second pressure reducing valve 22 is variable and has a set pressure on its downstream side adjustable to '0' (zero).

An explanation is given for a concrete structure of the valve assembly of this modification by relying on FIG. 7 with reference to FIG. 6. The bypass passage 14 is formed so that it extends through a bottom wall of the first attaching bore 60 obliquely and downwardly over the annular outlet 99 of the second check valve 32. Besides, vertically formed within the threaded leg 45 of the housing 3 is the third communication passage 114. This third communication passage 114 has an upper end connected to the first communication passage 39 to which the first pressure gauge 41 is attached. And it has a lower end opened to the under surface of the threaded leg 45. The second pressure reducing valve 22 enables the second opening spring 83 to adjust its opening force to '0' (zero) by loosening the second handle 82 most. This makes it possible for the second pressure reducing valve 22 to adjust the set pressure on its downstream side to '0' (zero). This second pressure reducing valve 22 forms a closing means (C) which stops gas flow-out from the gas outlet 5

When charging high pressure gas into the gas cylinder 1 attached with the valve assembly 2, first, the second handle 82 of the second pressure reducing valve 22 which is the closing means (C) is adjusted to set the set pressure on the downstream side thereof to '0' (zero). Next, the shut off valve 12 is opened to supply the high pressure gas to the charging port 6. Then the high pressure gas opens the second check member 96 and is charged from the gas inlet 4 into the gas cylinder 1 via the bypass passage 14, an upstream portion from the first pressure reducing valve 21 of the outlet passage 13, the shut off valve 12 and the inlet passage 11 in the mentioned order.

In the event that the second check valve 32 loses its checking function for any reason while the valve assembly 2 is being used, for instance, during the gas take-out, the gas passes through the outlet passage 13 and the bypass passage 14, and it leaks out of the charging port 6 to the exterior area.

In this case, the gas leakage is stopped by closing the shut off valve 12. Subsequently, after having repaired or replaced the second check valve 32 to restore its function, the valve assembly can be normally used.

The above-mentioned embodiment and modifications can be further modified as follows.

Both of the inlet passage 11 and the bypass passage 14 communicate with the interior space (A) of the gas cylinder 1 outside the housing 3. Instead, both of them may communicate with each other inside the housing 3 and only the gas inlet 4 or the discharging port 7 may communicate with the interior space (A).

Each of the shut off valve 12, the first pressure reducing valve 21, the second pressure reducing valve 22, the first check valve 31, the second check valve 32 and the downstream safety valve 34 may have a structure different from the exemplified one.

The first handle 56 of the shut off valve 12 may be of other kinds such as a single lever and a cup-like one, instead of the exemplified structure.

The second handle 82 of the second pressure reducing valve 22 may be of other kinds such as a lever-type one, instead of the exemplified structure.

What is claimed is:

1. A valve assembly for a gas cylinder comprising:
    a housing (3) including an inlet passage (11), a shut off valve (12), an outlet passage (13), and a gas outlet (5) between which a communication is provided in the mentioned order, and further including a bypass passage (14) and a charging port (6) communicating wit each other, the inlet passage (11) and the bypass passage (14) communicating with an interior space (A) of the gas cylinder (1);
    a first pressure reducing valve (21), a second pressure reducing valve (22), and a first check valve (31) for retaining residual pressure provided in the outlet passage (13) and arranged in series in the mentioned order from the shut off valve (12) toward the gas outlet (5);
    a second check valve (32) provided in the bypass passage (14) and arranged to inhibit a flow from the interior space (A) of the gas cylinder (1) to the charging port (6);
    the bypass passage (14) communicating with an inter-space between the shut off valve (12) and the first pressure reducing valve (21) of the outlet passage (13); and
    a closing means (C) arranged to stop gas flow-out from the gas outlet (5), the closing means (C) being provided downstream of a position where it communicates with the bypass passage (14) of the outlet passage (13), or at the gas outlet (5).

2. The valve assembly for the gas cylinder as set forth in claim 1, wherein at least one of the first pressure reducing valve (21) and the second pressure reducing valve (22) has a set pressure on its downstream side adjustable to '0' (zero) and forms the closing mean (C).

3. The valve assembly for the gas cylinder as set forth in claim 1, wherein a connector having the closing means (C) is detachably attached to the gas outlet (5).

4. The valve assembly for the gas cylinder as set forth in claim 1 wherein the first pressure reducing valve (21) is formed into a piston-type structure and the second pressure reducing valve (22) is constructed into a diaphragm-type structure.

5. The valve assembly for the gas cylinder as set forth in claim 4, wherein the first pressure reducing valve (21) of the piston-type comprises a first pressure reducing valve seat (63), a first pressure reducing member (67) which moves for opening and closing with respect to the first pressure reducing valve seat (63), a piston (65) connected to the first pressure reducing member (67), a first opening spring (66) which separates the first pressure reducing member (67) from the first pressure reducing valve seat (63); and a first actuation chamber (68) which actuates a pressure on the piston (65) to bring the first pressure reducing member (67) near the first pressure reducing valve seat (63), and the second pressure reducing valve (22) of the diaphragm type comprises a second pressure reducing valve seat (77), a second pressure reducing member (75) which moves for opening and closing with respect to the second pressure reducing valve seat (77), a diaphragm (80) connected to the second pressure reducing member (75), a second opening spring (83) which separates the second pressure reducing member (75) from the second pressure reducing valve seat (77), and a second actuation chamber (84) which actuates a pressure on the diaphragm (80), thereby allowing the second pressure reducing member (75) to approach the second pressure reducing valve seat (77).

6. The valve assembly for the gas cylinder as set forth in claim 5, wherein a flow resistance applying means (104) is provided between the first check valve (31) and the bas outlet (5).

7. The valve assembly for the gas cylinder as set forth in claim 4, wherein a flow resistance applying means (104) is provided between the first check valve (31) and the gas outlet (5).

8. The valve assembly for the gas cylinder as set forth in claim 1, wherein a flow resistance applying means (104) is provided between the first check valve (31) and the gas outlet (5).

9. The valve assembly for the gas cylinder comprising:

a housing (3) including an inlet passage (11), a shut off valve (12), an outlet passage (13), and a gas outlet (5) between which a communicating is provided in the mentioned order and further including a bypass passage (14) and a charging port (6) communicating with each other, the inlet passage (11) and the bypass passage (14) communicating with an interior space (A) of the gas cylinder (1);

a first pressure reducing valve (21), a second pressure reducing valve (22), and a first check valve (31) for retaining residual pressure provided in the outlet passage (13) and arranged in series in the mentioned order from the shut off valve (12) toward the gas outlet (5);

a second check valve (32) provided in the bypass passage (14) and arranged to inhibit a flow from the interior space (A) of the gas cylinder (1) to the charging port (6);

the housing (3) having an upper surface, a front surface, a rear surface and both side surfaces;

a first handle (56) for opening and closing the shut off valve (12) and a second handle (82) for adjusting a set pressure of the second pressure reducing valve (22) being arranged side by side on the upper surface of the housing (3) in a horizontal direction;

a first pressure gauge (41) which communicates with the interior space (A) of the gas cylinder (1) and a second pressure gauge (42) which communicates with a downstream side of the second pressure reducing valve (22) being disposed side by side on the front surface of the housing (3) in a vertical direction; and the gas outlet (5) and the charging port (6) being positioned side by side in the vertical direction on any one of the rear surface and the both side surfaces of the housing (3).

10. The valve assembly for the gas cylinder as set forth in claim 9, wherein the gas outlet (5) is arranged upwards of the charging port (6) and the second pressure gauge (42) is disposed upwards of the first pressure gauge (41).

11. The valve assembly for the gas cylinder as set forth in claim 10, wherein a flow resistance applying means (104) is provided between the first check valve (31) and the gas outlet (5).

12. The valve assembly for the gas cylinder as set forth in claim 9, wherein the first pressure reducing valve (21) is formed into a piston-type structure and the second pressure reducing valve (22) is constructed into a diaphragm-type structure.

13. The valve assembly for the gas cylinder as set forth in claim 12, wherein the first pressure reducing valve (21) of the piston-type comprises a first pressure reducing valve seat (63), a first pressure reducing member (67) which moves for opening and closing with respect to the first pressure reducing valve seat (63), a piston (65) connected to the first pressure reducing member (67), a first opening spring (66) which separates the first pressure reducing member (67) from the first pressure reducing valve seat (63), and a first actuation chamber (68) which actuates a pressure on the piston (65) to bring the first pressure reducing member (67) near the first pressure reducing valve seat (63), and the second pressure reducing valve (22) of the diaphragm type comprises a second pressure reducing valve seat (77), a second pressure reducing member (75) which moves for opening and closing with respect to the second pressure reducing valve seat (77), a diaphragm (80) connected to the second pressure reducing member (75), a second opening spring (83) which separates the second pressure reducing member (75) from the second pressure reducing valve seat (77), and a second actuation chamber (84) which actuates a pressure on the diaphragm (80), thereby allowing the second pressure reducing member (75) to approach the second pressure reducing valve seat (77).

14. The valve assembly for the gas cylinder as set forth in claim 9, wherein the bypass passage (14) communicates with an inter-space between the shut off valve (12) and the first pressure reducing valve (21) of the outlet passage (13), and a closing means (C) which stops gas flow-out from the gas outlet (5) is provided downstream of a position where it communicates with the bypass passage (14) of the outlet passage (13), or at the as outlet (5).

15. The valve assembly for the gas cylinder as set forth in claim 14, wherein the gas outlet (5) is arranged upwards of the charging port (6) and the second pressure gauge (42) is disposed upwards of the first pressure gauge (41).

16. The valve assembly for the gas cylinder as set for in claim 9, wherein a flow resistance applying means (104) is provided between the first check valve (31) and the gas outlet (5).

* * * * *

UNITED STATES PATENT AND TRADEMARK OFFICE
CERTIFICATE OF CORRECTION

PATENT NO.    : 6,766,829 B2
DATED         : July 27, 2004
INVENTOR(S)   : Masaru Takeda et al.

It is certified that error appears in the above-identified patent and that said Letters Patent is hereby corrected as shown below:

<u>Column 11,</u>
Line 9, delete "63;" and replace with -- (63), -- and
Lines 9 and 10, the paragraph indentation should be removed and these lines combined.

Signed and Sealed this

Twenty-ninth Day of March, 2005

JON W. DUDAS
*Director of the United States Patent and Trademark Office*